United States Patent Office 3,376,244
Patented Apr. 2, 1968

3,376,244
POLYPROPYLENE WAX FILM
Victor A. Rundle, Oakland, Calif., assignor to Chevron Research Company, a corporation of Delaware
No Drawing. Filed Oct. 30, 1964, Ser. No. 407,897
6 Claims. (Cl. 260—28.5)

ABSTRACT OF THE DISCLOSURE

Wax-stereoregular polypropylene compositions are used having major amounts of wax to form self-sustaining films having excellent tensile properties by extruding the wax polypropylene composition at about the fusion temperature of the mixture and then rapidly cooling the extrudate.

---

This invention concerns novel wax polymer compositions which find use as films and coatings, particularly for packaging.

Waxes, particularly those derived from petroleum, have found wide application as coatings for wrapping paper. However, the wax tends to peel off and crack because of inherent shortcomings in physical properties. Moreover, the waxes in themselves are much too brittle to form an independent, stable film. Films of wax crack with only mild stresses, the wax film being incapable of being stretched or bent. Waxes combined with typical additive grade (low molecular weight) polyethylenes yield a material having good tensile strength as coatings, but lacking ability to elongate under stress.

It has now been found that wax films with excellent tensile properties can be prepared by mechanically combining wax and high molecular weight stereoregular polypropylene and extruding the wax-polypropylene mixture under conditions which approximate those normally used for the extrusion of polypropylene. Accordingly, the extrudate is rapidly cooled to a temperature significantly below the melting temperature of the wax.

In preparing the novel films of this invention, the wax and high molecular weight stereoregular polypropylene may, optionally, be mechanically mixed prior to extruding, in order to relatively homogeneously distribute the polypropylene throughout the wax. The polypropylene may be used in the form of powder, pellets, compacts, or other convenient form and size. The wax will generally be present in the form of a powder or crushable chunks in order to facilitate the mixing of the wax and polypropylene.

Although the wax and polypropylene may be directly introduced into the extruder hopper without prior mixing, preferably, the wax-polypropylene mixture is formed and then extruded in a pelletizer to form pellets of the wax-polypropylene mixture. The pellets may then be introduced into a film extruder, having a temperature at the extruder head or die above the polypropylene-wax mixture fusion temperature; generally this will be above the polypropylene melting temperature, i.e., 320° F. Usually, the extrusion temperature will be in the range of about 400° to 550° F.

Various additives may be included with the wax-polypropylene mixture, such as stabilizers, pigments, slip agents, etc., depending on the particular use for the film. As the extrudate leaves the die, it is rapidly cooled from the mixture's fusion temperature to a temperature at least 150° F. below the fusion temperature, preferably at least about 250° to 450° F. below, to bring the temperature of the extrudate to about 30°–150° F., desirably 50°–135° F., more preferably 50°–125° F. The time period in which the extrudate is cooled from the melt temperature will generally be about .001 second to 2 seconds, preferably about 0.005 to 0.1 second.

The cooling can be achieved by any convenient mechanical means, by depositing the extrudate on a cooled surface, passing the extrudate through a cooling bath, etc.

The extruded film may be laid directly onto a chill roll or onto a support, e.g., paper, and then rapidly cooled, permitting sufficient time for the wax-polypropylene film to adhere to the support. To permit rapid efficient cooling throughout the thickness of the film, the film thickness will generally be less than about 20 mils, usually in the range of about 0.1–10 mils, more usually in the range of about 0.5–5 mils.

The films thus formed have excellent flexibility, there being no evidence of cracking or flaking off of the wax when the film is bent or twisted. The films show excellent impact strength and elongation, as well as yield strength, tensile strength and tear strength. For the most part, the films appear homogeneous and are clear or translucent.

The film's physical properties, e.g., tensile strength, can be improved by orienting the film along the machine and/or transverse direction. Usually, the draw ratio in a single direction would be in the range of 1–9:1, more usually in the range of 1–6:1. When orienting in both directions, the draw ratio in each direction will generally be in the range of 1–4:1.

The conditions for extruding polypropylene to form polypropylene film, as well as subsequent treatment of the film, is found in "Plastics Extrusion Technology," Allen L. Griff, Reinhold, 1962. Also of interest is Technical Report TR-9, March 1961, distributed by the Eastman Chemical Products, Inc., Plastics Division.

The wax-polypropylene composition will have from about 40 to 80 weight percent wax and from 20 to 60 weight percent polypropylene. More usually, the mixture will have about 50 to 70 weight percent wax and 30 to 50 weight percent polypropylene. As previously indicated, in many instances it will be advantageous to have other additives, e.g., stabilizers, clarity improvers, etc. Generally, the stabilizers will range from about 0 to 10 weight percent of the wax-polypropylene composition.

Illustrative of various additives which may be included in the wax-polypropylene composition are antioxidants: 2,2′-methylene-4-methylphenol, 2,6-di-tertiarybutyl-4-methylphenol, other alkyl substituted phenols commercially available under the trade designation "Santonox"; color stabilizers; epoxydized fatty acids, triphenylphosphite, etc.; dyes; lubricants: calcium fatty acid salts; etc. The amounts of the additives individually or together will rarely exceed 10 percent, usually not exceeding 5 percent. Generally, the weight of the additives will be in about 0.001–2 percent of the wax-polypropylene composition.

The wax used for the composition is a wax derived from petroleum sources or other wax having similar physical properties. This includes scale waxes, refined waxes and microcrystalline waxes, and combinations of these waxes. The wax will generally have an AMP (ASTM D 127–60) of about 125 to 220° F., more usually of 140 to 220° F., and preferably of 145 to 175° F. The oil content will generally be less than about 10 percent and more usually less than about 5 percent. The preferred wax is a refined wax, i.e., the wax has been extracted with a suitable solvent to remove oil and other impurities.

The polypropylene is a high molecular weight stereoregular polypropylene, most conveniently prepared by the use of "Ziegler-type" catalysts. These catalysts include a reducible heavy metal compound plus an organo-metal reducing agent. The most common catalysts are the titanium halides and alkyl aluminum or alkyl aluminum halides.

The molecular weight of the polymer will generally be at least about 200,000 and may be as high as 5 million or more. Preferably, the molecular weight will be in the range of about 250,000 to 1,500,000 (alternatively, the molecular weight may be described as its melt flow rate, MFR, $N_2$, 230° C., 2160 gms., ASTM 1238–62T, Method L). The melt flow rate (MFR) will be in the range of about 0.1–10. However, greatly superior tensile properties are obtained with MFR's in the range of about 0.1–3, particularly in the range of about 0.1–1.0.

The stereoregular polypropylene will generally be isotactic. That is, large numbers of repeating units along the chain will have the same stereoconfiguration. These polymers will generally have at least 75 number percent of the monomers having the same stereoconfiguration, more usually at least about 90 number percent. For the most part, the polymers are readily crystallizable and can be induced to crystallize by various means known in the art.

The following examples are offered by way of illustration and not by way of limitation.

Example I

Refined wax 160/165° F. AMP (70 parts) and 30 parts polypropylene (MFR=0.4 gm./10 minutes) were mixed in a Banbury mixer and the relatively homogeneous mixture heated to 500° F. The fused composition was then used to form a film using a "drawdown" procedure or "doctor-blade" method. The basic method is found in "Paint Testing Manual," 12th ed., 1962, H. A. Gardner et al. The procedure was modified by heating the doctor blade (Baker film applicator) and one end of the steel drawdown plate to a temperature (400°–500° F.) which is above the melting point of the wax-polymer blend.

The results of the physical property measurements of the above film appear in Table I, along with the same results for other films similarly prepared. The results reported for elongation and tensile strength were determined according to ASTM D–882–56T (constant rate of grip separation). Testing speed: 20″/min.; distance between jaws: 2.5″.

TABLE I

| Example | Polymer, MFR | Wt., percent | Elongation, percent | Tensile Strength at Yield, p.s.i. | Tensile Strength at Break, p.s.i. |
|---|---|---|---|---|---|
| I | 0.4 | 30 | 700 | 2,300 | 4,400 |
| II | 3.0 | 30 | 400 | 2,400 | 2,500 |
| III | 7–8 | 30 | 400 | 1,500 | 1,600 |

[1] Machine direction.

It is evident from the above table that in direct contrast to wax, the films have good elongation and strength properties.

Example IV

Refined wax 160/165° F. AMP (70 parts) and 30 parts polypropylene (MFR 0.4 gm./10 minutes) were mixed in a Banbury mixer and then extruded in a pelletizer. The pellets were extruded in a one-inch film extruder, having a die temperature of 450° F. at a rate of 11.25 ft./min. The chill roll maintained at 115° F. was placed 0.5 inch from the die. The film had a thickness of about 1.0–1.9 mils.

The following table described the conditions under which two other films were prepared using 50 weight percent polypropylene.

TABLE II

| Example | Die Temperature, ° F. | Chill Roll Temp., ° F. | Take Off Speed, f.p.m. | Distance of Die to Roll, Inches | Film Thickness, Mils |
|---|---|---|---|---|---|
| V | 418 | 70 | 5.8 | 1 | 0.8–1.0 |
| VI | 422 | 70 | 10.8 | 1 | 1.5–2.5 |

The following table indicates the results obtained with the above films when tested as previously described.

TABLE III

| | IV | | V | | VI | |
|---|---|---|---|---|---|---|
| | MD | TD | MD | TD | MD | TD |
| Elongation | 502 | 339 | 386 | 387 | 490 | 433 |
| Yield Stress, p.s.i. | 1,600 | 2,100 | 2,400 | 3,120 | 2,290 | 1,720 |
| Stress at Break, p.s.i. | 2,425 | 1,365 | 5,290 | 2,280 | 4,940 | 2,535 |
| Initial Modulus, p.s.i. | 75,800 | 43,100 | 104,210 | 83,300 | 75,300 | 71,500 |
| Tear Strength, g./mil [1] | 143 | 179 | 16 | 424.0 | 37.3 | 217 |
| Impact Strength, p.s.i.[2] | 2,805 | | [3] 7,325+ | | [3] 5,885+ | |

[1] ASTM D 689–44.
[2] Spencer attachment to Elmendorf Tear Tester.
[3] Film did not break.
MD=Machine Direction; TD=Transverse Direction.

As the prior data evidence, the wax-polypropylene films form strong self-sustaining films having excellent tensile properties. The films, however, may be used in conjunction with a variety of supports and be extruded onto such materials as aluminum, paper, polyethylene, polypropylene, etc.

As will be evident to those skilled in the art, various modifications on this process can be made or followed, in the light of the foregoing disclosure and discussion, without departing from the spirit or scope of the disclosure or from the scope of the following claims.

I claim:

1. A method for preparing self-sustaining wax films which comprises mechanically combining wax having an AMP in the range of 125 to 220° F. with from 20–60 weight percent of the total composition of stereoregular polypropylene having an MFR in the range of from about 0.1 to 10.0 and a molecular weight in the range of 200,000 to 1,500,000 and extruding the wax-polypropylene mixture at a temperature of at least about the fusion temperature of the stereoregular polypropylene and wax, and rapidly cooling the extrudate in less than two seconds to a temperature at least 150° F. below the extrusion temperature, forming a self-sustaining film.

2. A method for preparing self-sustaining wax films which comprises mechanically combining petroleum derived wax of AMP in the range 125 to 220° F. and stereoregular polypropylene having an MFR of 0.1–3 and a molecular weight greater than 200,000 and less than 1,500,000 and in an amount of about 30 to 50 weight percent of the total composition, extruding the wax-polypropylene mixture at a temperature of at least about the fusion temperature of the stereoregular polypropylene and wax, and rapidly cooling the extrudate in less than 2 seconds to a temperature at least 150° F. below the extrusion temperature, forming a self-sustaining film.

3. A method according to claim 2, wherein the wax has an AMP of 155–165° F. and the period of time in which the extrudate is cooled is from 0.001 to 0.1 second.

4. A film prepared according to claim 1.

5. A film prepared according to claim 2.

6. A composite wherein a wax-polypropylene film according to claim 1 is extruded onto paper.

References Cited

UNITED STATES PATENTS

| | | | |
|---|---|---|---|
| 3,210,305 | 10/1965 | Coenen et al. | 260—28.5 |
| 3,217,073 | 11/1965 | Olson et al. | 264—178 |
| 3,243,396 | 3/1966 | Hammer | 260—28.5 |
| 3,258,319 | 6/1966 | Cox | 260—28.5 |

FOREIGN PATENTS

| | | |
|---|---|---|
| 849,389 | 9/1960 | Great Britain. |
| 851,727 | 10/1960 | Great Britain. |
| 620,375 | 5/1961 | Canada. |

MORRIS LIEBMAN, *Primary Examiner.*

B. A. AMERNICK, *Assistant Examiner.*